(12) United States Patent
Pekoz et al.

(10) Patent No.: US 10,547,489 B2
(45) Date of Patent: Jan. 28, 2020

(54) OFDM RECEPTION UNDER HIGH ADJACENT CHANNEL INTERFERENCE WHILE PRESERVING FRAME STRUCTURE

(71) Applicants: Berker Pekoz, Tampa, FL (US); Zekeriyya Esat Ankarali, Carlsbad, CA (US); Selcuk Kose, Tampa, FL (US); Huseyin Arslan, Tampa, FL (US)

(72) Inventors: Berker Pekoz, Tampa, FL (US); Zekeriyya Esat Ankarali, Carlsbad, CA (US); Selcuk Kose, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/242,288

(22) Filed: Jan. 8, 2019

(65) Prior Publication Data

US 2019/0288901 A1 Sep. 19, 2019

Related U.S. Application Data

(60) Provisional application No. 62/642,349, filed on Mar. 13, 2018.

(51) Int. Cl.
*H04L 27/38* (2006.01)
*H04L 25/02* (2006.01)
*H04L 27/26* (2006.01)

(52) U.S. Cl.
CPC ......... *H04L 27/38* (2013.01); *H04L 25/0202* (2013.01); *H04L 27/2605* (2013.01); *H04L 27/2628* (2013.01)

(58) Field of Classification Search
CPC . H04L 27/38; H04L 25/0202; H04L 27/2605; H04L 27/2628
USPC .......................................................... 375/261
See application file for complete search history.

(56) References Cited

U.S. PATENT DOCUMENTS

| | | | |
|---|---|---|---|
| 6,795,424 B1 | 9/2004 | Kapoor et al. | |
| 6,934,246 B2 | 8/2005 | Park | |
| 2004/0001427 A1 | 1/2004 | Belotserkovsky et al. | |
| 2005/0174927 A1* | 8/2005 | Stephens | H04L 27/20 370/206 |
| 2008/0219371 A1* | 9/2008 | Hong | H04L 25/022 375/260 |
| 2011/0158342 A1* | 6/2011 | Srinivasan | H04L 25/0212 375/285 |

(Continued)

OTHER PUBLICATIONS

Ankarali et al., Flexible Radio Access Beyond 5G: A Future Projection on Waveform, Numerology, and Frame Design Principles. IEEE Access. 2017. vol. 5: 18295-18309.

(Continued)

*Primary Examiner* — Michael R Neff
(74) *Attorney, Agent, or Firm* — Molly L. Sauter; Smith & Hopen, P.A.

(57) ABSTRACT

System and method based upon an OFDM symbol, including a cyclic prefix (CP), that is received after being transmitted over a multiple access channel, wherein the CP is removed, and a Hann window is applied to the symbol. FFT is then applied to the Hann windowed symbol to obtain the frequency domain subcarriers. The pilot symbols are filtered accordingly to obtain Hann windowed pilots to estimate effective channel. Inter-carrier interference is calculated and removed.

13 Claims, 8 Drawing Sheets

(56) References Cited

U.S. PATENT DOCUMENTS

| | | | |
|---|---|---|---|
| 2012/0134446 A1* | 5/2012 | Zhou | H03M 13/655 375/320 |
| 2013/0343446 A1* | 12/2013 | Eliaz | H04L 27/2628 375/230 |
| 2014/0192848 A1* | 7/2014 | Rao | H04L 5/00 375/219 |
| 2015/0333944 A1 | 11/2015 | Bae et al. | |
| 2015/0349995 A1 | 12/2015 | Zhang et al. | |
| 2017/0093607 A1* | 3/2017 | Kumar | H04L 27/34 |

OTHER PUBLICATIONS

Lupas and Verdu. Near-far resistance of multiuser detectors in asynchronous channels IEEE Trans. Commun. 1990. vol. 38 (No. 4): 496-508.

Abdoli et al., Filtered OFDM: A new waveform for future wireless systems. Proc. 2015 IEEE 16th Int. Workshop on Signal Process. Advances in Wireless Commun., Stockholm, SE Jun. 2015: 66-70.

Muschallik. Improving an OFDM reception using an adaptive Nyquist windowing. IEEE Trans. Consum. Electron, 1996. vol. 42 (No. 3): 259-269.

Güvenkaya et al., A Windowing Technique for Optimal Time-Frequency Concentration and ACI Rejection in OFDM-Based Systems. IEEE Trans. Commun. 2015. vol. 63 (No. 12): 4977-4989.

Sahin and Arslan. Edge Windowing for OFDM Based Systems. IEEE Commun. Lett. 2011 vol. 15 (No. 11): 1208-1211.

Peköz et al., Adaptive Windowing of Insufficient CP for Joint Minimization of ISI and ACI Beyond 5G. Proc. 2017 IEEE 28th Annu. Int. Symp. Personal, Indoor, and Mobile Radio Commun. Montreal, QC. Oct. 2017: 1-5.

* cited by examiner

OFDM RECEPTION UNDER HIGH ADJACENT CHANNEL INTERFERENCE WHILE PRESERVING FRAME STRUCTURE

CROSS-REFERENCE TO RELATED APPLICATIONS

This application claims priority to U.S. Provisional Patent Application No. 62/642,349 filed on Mar. 13, 2018, entitled "OFDM Reception Under High Adjacent Channel Interference While Preserving Frame Structure", which is incorporated by reference herein in its entirety.

FEDERALLY SPONSORED RESEARCH OR DEVELOPMENT

This invention was made with Government support under Grant No. 1609581 awarded by National Science Foundation. The government has certain rights in the invention.

BACKGROUND OF THE INVENTION

Next generation cellular communication standards beyond 5G are planned to schedule non-orthogonal subframes, referred to as numerologies, in adjacent bands. Numerologies, in their current definition, refer to cyclic prefix (CP)-orthogonal frequency division multiplexing (OFDM) (CP-OFDM) waveform using different subcarrier spacings, and at some extents, using assorted CP rates. Different numerologies interfere with one-another, and adjacent channel interference (ACI) becomes the factor limiting data rates if the interfering block outpowers the desired block at the intended receiver. Receiver windowing reduces ACI absorption, and various methods are extensively studied in the literature to reduce energy absorbed from sidebands.

Contemporary orthogonal frequency division multiplexing (OFDM) receiver windowing algorithms used to mitigate adjacent channel interference (ACI) require cyclic extensions that are not disturbed by multipath interference. Such algorithms are unusable unless adopted by a new backward incompatible standard that incorporates such extensions. Additional temporal extensions lessen throughput by reducing effective symbol rate and specifically endanger high mobility wireless communication by pushing the period between pilots beyond the coherence time of the channel, requiring increased pilot overhead and resulting in inter-carrier interference (ICI). Additionally, conventional algorithms do not perform as well with limited extensions.

Accordingly, what is needed in the art is a receiver that improves the capacity of the system that does not require modifications at the transmitter and that results in structures that are orthogonal to, and support, legacy devices. However, in view of the art considered as a whole at the time the present invention was made, it was not obvious to those of ordinary skill in the field of this invention how the shortcomings of the prior art could be overcome.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved receiver is now met by a new, useful, and non-obvious invention.

In various embodiments, the present invention provides a receiver that yields higher capacities than the currently used receivers without requiring modification to the transmitter. In the present invention, gains are attainable without modifications to the transmitter, hence the modifications made to the system do not disturb the legacy frame structure and thereby remain orthogonal to legacy signals. The invention also presents the higher achievable gains if modifications that do not disturb the legacy frame structure and remain orthogonal to legacy signals are allowed at the transmitting side.

In one embodiment, the present invention provides a method for Orthogonal Frequency Division Multiplexing (OFDM) transmission and reception. The method includes, receiving a CP-OFDM symbol comprising a cyclic prefix (CP) at a Hann receiver, removing the cyclic prefix from the received CP-OFDM symbol to generate an OFDM symbol. The method further includes, applying a Hann window to the OFDM symbol to obtain a Hann windowed OFDM symbol, applying Fast Fourier Transformation (FFT) to the OFDM symbol to obtain a plurality of subcarriers. In this embodiment, the CP-OFDM symbol processed by the Hann receiver may be a $\pi/2$-binary phase shift keying (BPSK) modulated CP-OFDM symbol, a $\pi/2$-amplitude shift keying (ASK) modulated CP-OFDM symbol or a Quadrature Amplitude Modulated (QAM) CP-OFDM symbol.

In an additional embodiment, the present invention provides a system for Orthogonal Frequency Division Multiplexing (OFDM) transmission and reception. The system includes, a Hann receiver for receiving a CP-OFDM symbol comprising a cyclic prefix (CP) and for removing the cyclic prefix from the received CP-OFDM symbol to generate an OFDM symbol. The Hann receiver is further for, applying a Hann window to the OFDM symbol to obtain a Hann windowed OFDM symbol, applying Fast Fourier Transformation (FFT) to the OFDM symbol to obtain a plurality of subcarriers. In this embodiment, the CP-OFDM symbol processed by the Hann receiver may be a $\pi/2$-binary phase shift keying (BPSK) modulated CP-OFDM symbol, a $\pi/2$- amplitude shift keying (ASK) modulated CP-OFDM symbol or a Quadrature Amplitude Modulated (QAM) CP-OFDM symbol.

The invention addresses the presence of adjacent channel interference on the signal of a desired user, in a scenario where no clean CP is available, conventional receiver windowing cannot be applied. It is proposed to utilize the described Hann OFDM receiver to improve the capacity of the system. Other solutions are available that require modifications at the transmitter, and resulting structures are non-orthogonal with legacy. The proposed structures are orthogonal with legacy and two of the three embodiments do not require transmitter modifications.

The novel structure includes a classical CP-OFDM symbol which is received after passing from a multiple access channel. The CP is removed, and Hann window is applied to the symbol and FFT is applied to the Hann windowed symbol to obtain subcarriers.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the invention, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

In various embodiments, the present invention provides backward compatible Hann windowing OFDM receivers that yield capacities higher than that of state-of-the-art conventional and extensionless windowing receivers, in the presence of strong ACI, without requiring temporal redundancies and changes to the currently standard frame structure. The Hann window rejects unstructured ACI better than previously proposed art, in exchange for structured self-interference in the form of ICI across data carriers. A maximum ratio combining with successive interference cancellation (MRC-SIC) receiver is proposed to resolve the induced ICI and receive symbols transmitted by standard transmitters currently in use, at the expense of increased computational complexity. Another modified transceiver structure that orthogonalizes the post-Hanning ICI and data using the proposed π/2-ASK modulation is also proposed for future standards to allow performance gains with the same computational complexity to that of conventional OFDM. The symbols generated using the modified transmitter do not disturb and can be used alongside standard 4G and 5G mobile communication frame structures.

Figure 1A:
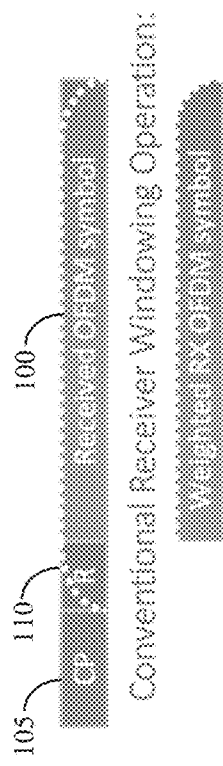
FIG. 1A is an illustration of the standard symbol structure include the cyclic prefix (CP) and received OFDM symbol.
Figure 1B:
FIG. 1B is an illustration of symbol structure proposed in prior conventional windowing of OFDM symbols and conventional windowing methods, as is currently known in the art.

Current state-of-the-art receiver windowed-OFDM (W-OFDM) algorithms require an additional periodic extension of the transmitted signal that is free from multipath echoes of the previous symbol to maintain orthogonality of the system. Modifying the symbol structure defined in the standard breaks orthogonality with all other devices that use the standard frame structure. Although non-orthogonal subframes are multiplexed to adjacent bands, 5G new radio (NR) standard currently allows at most 4 sub-frame configurations sharing a band, imposing an upper limit on the number of interfering user groups. The gains that can be obtained by introducing such a penalty to the whole system must be calculated carefully for each case. Even if any gain for the desired user itself can be made possible, introducing such elevated interference to others is not allowed by the current standards. Furthermore, both ends of the communication must be aware of and agree to make such change. That is, the conventional receiver windowing operation illustrated in FIG. 1B cannot be used if either side is a legacy device capable of using only the standard frame structure, as shown in FIG. 1A. The standard frame structure shown in FIG. 1A includes the received OFDM standard symbol 100 and a cyclic prefix (CP) 105 extension. As shown in FIG. 1B, the received windowed OFDM symbol 115 results from the application of a conventional receiver windowing operation, which requires an additional extension to be used for windowing 110. Since this extension 110 is not part of the standard symbol structure shown in FIG. 1A, the prior art techniques shown in FIG. 1B cannot be used to process signals that were transmitted from legacy devices.

Another problem regarding adding extensions for windowing is that it increases the effective symbol duration which in turn reduces the effective symbol rate. Due to the time variation of the channel in high mobility systems, this not only causes a direct reduction in data rate, but also either further cuts the data rate back if relative pilot overhead is increased to mitigate the reduction in absolute pilot periodicity, or if no modification is done, reduces capacity due to the channel estimation errors.

An approach that utilizes the CP disturbed by multipath interference for windowing to reject ACI while conserving the legacy frame structure has been previously proposed. Reducing ACI with this approach comes at the cost of introducing intersymbol interference (ISI), which consists of the sum of low powered contributions from all subcarriers of the previous symbol. The computational complexity of attempting to cancel the ISI is high due to the large number of interfering components. Furthermore, this approach is not effective with shorter CP durations that accompany vehicular communication numerologies.

Figure 2B:
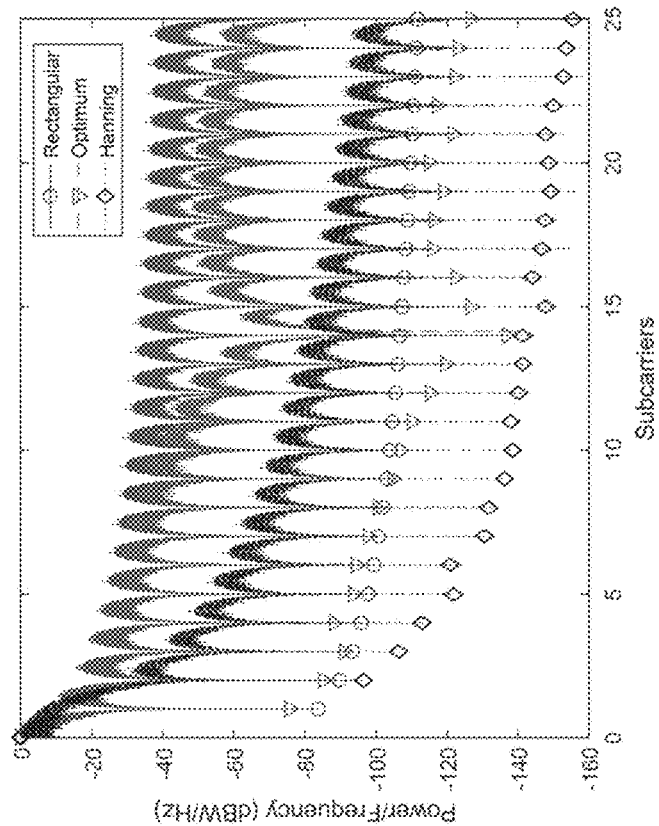
FIG. 2B is a graphical illustration comparing post-window interference power absorbed by a subcarrier, if a rectangular, optimum extensionless window using whole normal CP overhead and a Hann window is used.
Figure 2A:
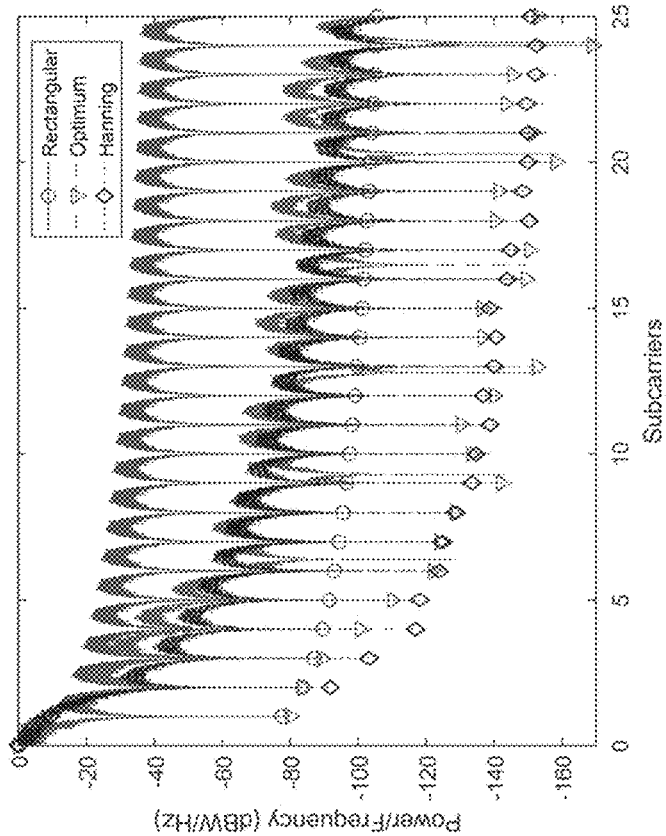
FIG. 2A is a graphical illustration comparing post-window interference power absorbed by a subcarrier, if a rectangular, optimum extensionless window using whole extended CP overhead and a Hann window is used.

The power spectral density (PSD), marked as optimum in FIG. 2A and FIG. 2B, is obtained by performing an extensionless windowing operation using the whole CP duration. In the case of the vehicular numerology with extended CP overhead, as shown in FIG. 2A, the window works as expected and it is able to confine the spectrum within the resource block (RB), as intended. However, if the same algorithm is applied to the vehicular numerology with normal CP overhead, as shown in FIG. 2B, the window underperforms and provides limited benefit over the standard rectangular window, even if the whole CP duration is still used. It should be noted that this is the performance upper bound for a normal CP overhead. If a shorter window duration is used to utilize part of the CP for its actual purpose, to mitigate multipath channel and limit ISI, the performance is further reduced.

If CP, or any other extension, is not used for windowing and a receiver window function other than rectangular is used, the zero crossings of the window's frequency response differs from that of the transmitted subcarriers. This causes heavy inter-carrier interference (ICI) between received subcarriers, which results in problems greater than the avoided ACI, in most cases. Attempting to cancel the resulting ICI yields little return if the ICI consists of weak contributions from numerous subcarriers, and the computational complexity of the cancellation renders such implementation impractical.

Figure 1C:
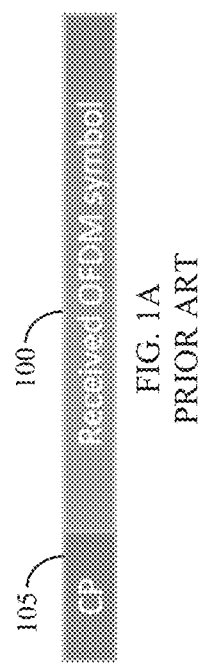
FIG. 1C is an illustration of Hann windowing of standard OFDM symbols, in accordance with an embodiment of the present invention.
Figure 1C:
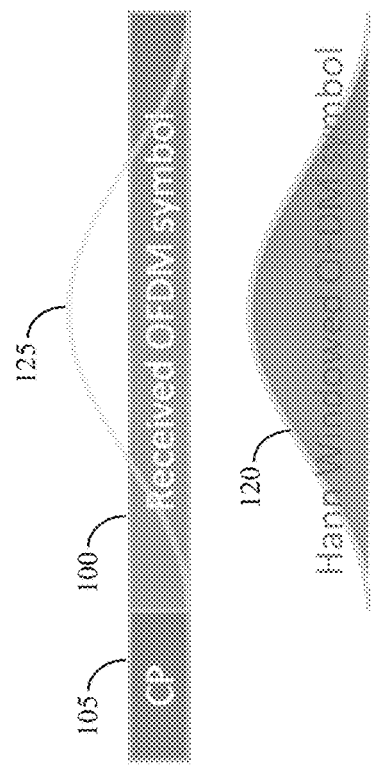

The Hann window function reveals a special case, wherein if a symbol transmitted using standard symbol structure, as in FIG. 1A, is received using a Hann window 125 to generate a Hann windowed OFDM symbol 120, as demonstrated in FIG. 1C, this yields the symbol that is received with a Hann window that has double the subcarrier spacing of the data itself. However, the frequency of zero-crossings of Hann function's frequency response doubles after the main lobe and matches the subcarrier spacing of the transmitted signal. Therefore, if the received unextended symbol is windowed using the Hann function, only subcarriers that are adjacent to a subcarrier interfere with it. This ICI consists of strong components from few contributors, of which handling is computationally easier and yields better performance compared to attempting to resolve weak contributions from a greater number of subcarriers or ACI. Therefore, in addition to its high out-of-band rejection comparable to optimum window function with extended CP overhead, shown in FIG. 2A, Hann windowing also enjoys particular application level advantages, such as reduced computational complexity.

As such, in accordance with various embodiments of the present invention, the characteristics of the Hann window are exploited to improve the capacity of OFDM reception in the case where an interfering signal is present in the adjacent band. While doing so, the frame structure is preserved to satisfy interoperability with current and legacy structures, therefore symbol durations were not extended. That is, the symbols generated using each of the methods of the present invention remain orthogonal to standard legacy OFDM structures.

Embodiments of three transceivers are described below that utilize the Hann window, but handle the interference in different ways. The embodiments require different levels of modification at the currently standardized commercial transmitter and receiver structures with various complexities and yield different capacity improvements for different levels of ACI power.

Figure 3:
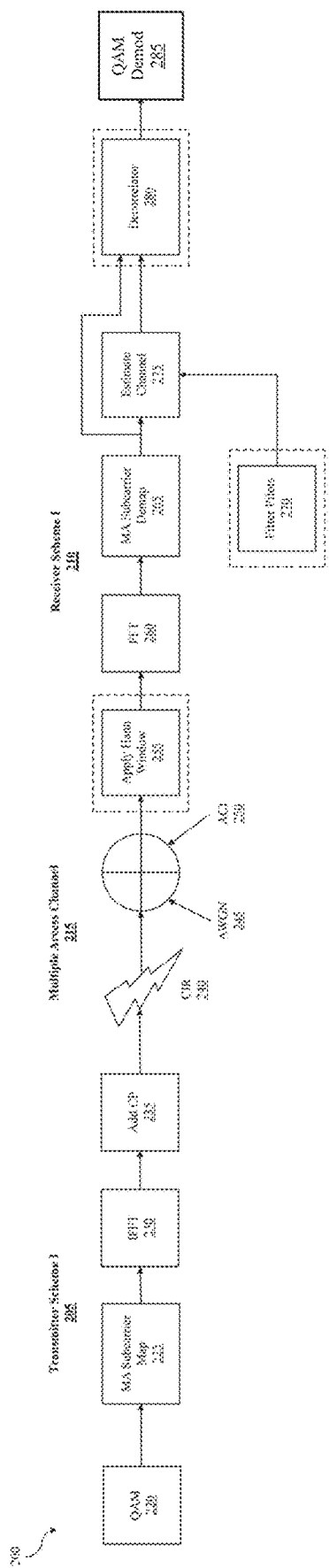
FIG. 3 is a block diagram illustrating a first transceiver scheme having modifications to only the receiver, in accordance with an embodiment of the present invention.
Figure 4:
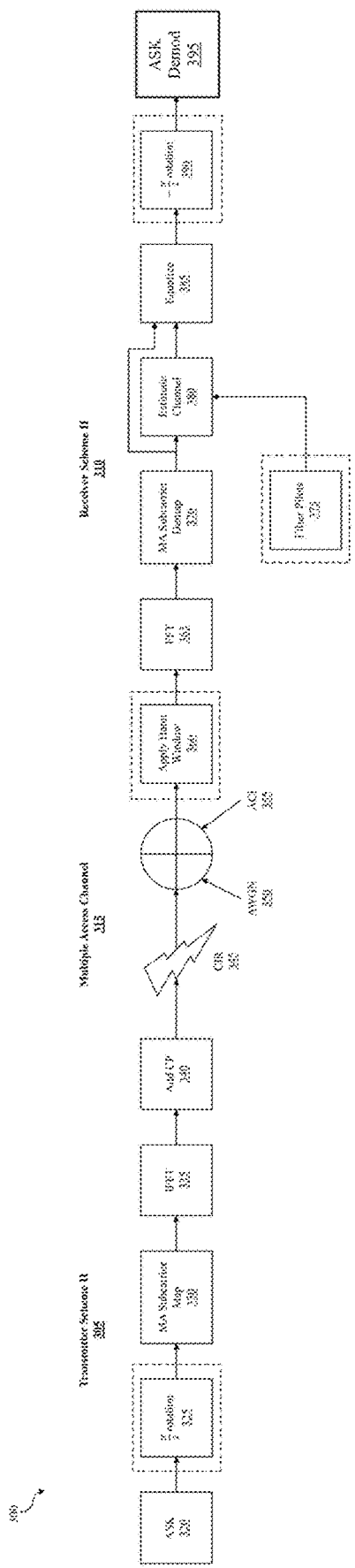
FIG. 4 is a block diagram illustrating a second transceiver scheme having modifications to both the transmitter and receiver for a r/2-MASK modulated signal, in accordance with an embodiment of the present invention.
Figure 5:
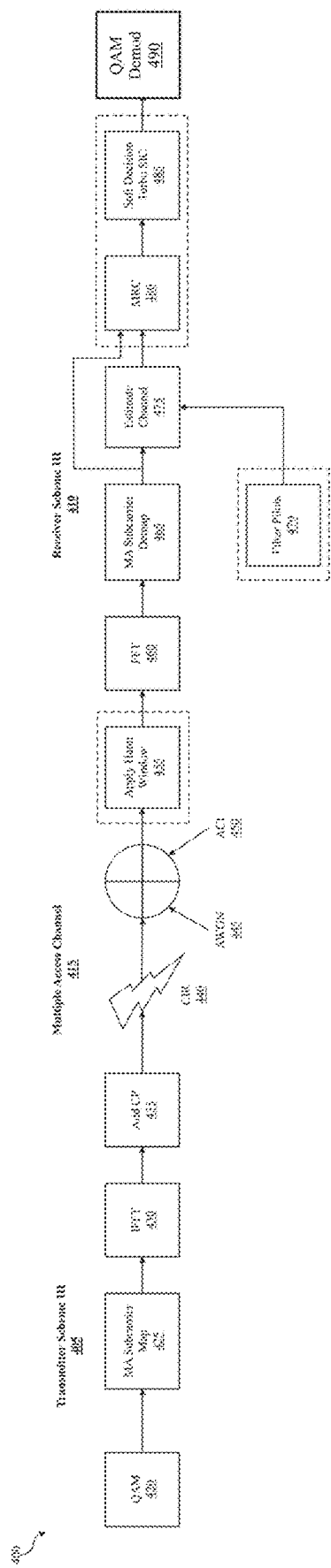
FIG. 5 is a block diagram illustrating a third transceiver scheme having modifications to only the receiver for a QAM modulated signal, in accordance with an embodiment of the present invention.

A block diagram of the transceivers, with an emphasis on changes to legacy transceivers, is provided in FIG. 3-FIG. 5, wherein the blocks surrounded by dashed lines are modifications to the legacy structures, as provided by the embodiments of the present invention and the remaining blocks are classical transceiver blocks. It is noted that $\pi/2$-MASK, the novel improvement provided by the present invention, is the idea of using Hann receivers to receive OFDM symbols, and the novel work includes: (1) the implementation of a practical Hann receiver (2) derivation of resulting interference (3) deriving the corresponding optimal maximum ratio combining (MRC) coefficients in this case (4) a channel estimation technique for use with Hann windowing OFDM receivers (5) invention of a single-carrier modulation hereby referred to as $\pi/2$-MASK for use with Hann windowing OFDM receivers.

The present invention does not contribute to the other techniques that are used to handle the interference and applied receiver algorithms readily available in the literature, other than the invention of $\pi/2$-MASK modulation technique. The other techniques are only used to demonstrate the operability of the Hann windowed OFDM receiver, and the authors do not claim that these are the optimum receivers in any sense, better receivers can be implemented that may yield higher performance gains.

With reference to FIG. 3, in a first exemplary embodiment, an OFDM communication system 200 includes a first transmitter scheme 205 and a first receiver scheme 210 in wireless communication over a multiple access channel 215. In the first transmitter scheme 205 data that is QAM modulated 220 is shaped into multiple access (MA) OFDM data subcarriers 225. Inverse Fast Fourier Transformation 230 is then performed on the OFDM data subcarriers to generate the OFDM waveforms. A cyclic prefix is then added 235 to the OFDM waveforms before transmission over the multiple access channel 215. A channel impulse response (CIR) 240 is associated with the channel 215. Additive white Gaussian Noise (AWGN) 245 and Adjacent Channel Interference (ACI) 250 are introduced by the channel 215 during transmission. The first receiver scheme 210 includes a Hann receiver 255 for receiving the OFDM waveforms transmitted over the multiple access channel 215. The Hann receiver 255 performs Hann windowing of the received OFDM waveforms, as will be explained in more detail below. The frequency domain symbols are then obtained from the windowed OFDM symbols by performing FFT 260 and multiple access subcarrier demapping 265. A filter must be applied to the transmitted pilot sequence to obtain the observed pilot sequence 270 for proper channel estimation, as will be explained in more detail below. Using the observed pilot sequence, the channel is estimated 275. A conventional decorrelator is applied 280 to the demapped data symbols using the channel based on the channel estimate 275. Finally, QAM demodulation 285 is performed to recover the transmitted data.

As such, this first exemplary embodiment provides the highest capacity if the allocated guard band between the subbands of each user is high and the first exemplary embodiment does not require any modifications at the transmitting device. However, this embodiment performs relatively poorly compared to the second and third embodiments if the allocated guard band between the subbands of each user is relatively low, and the second embodiment, to be explained below, is computationally less demanding. This embodiment can be implemented in any receiver device that abides by the current and future releases of the Long Term Evolution (LTE) standard and Wi-Fi standard, or the upcoming 5G cellular communication standard.

With reference to FIG. 4, in a second exemplary embodiment, an OFDM communication system 300 includes a second transmitter scheme 305 and a second receiver scheme 310 in wireless communication over a multiple access channel 315. In the first transmitter scheme 305 data is first ASK modulated in the conventional sense 320, then $\pi/2$-rotated 325. The $\pi/2$-MASK modulated symbols are then shaped into multiple access (MA) OFDM data subcarriers 330. Inverse Fast Fourier Transformation (IFFT) 335 is then performed on the OFDM data subcarriers to generate the OFDM waveforms. A cyclic prefix is then added 340 to the OFDM waveforms before transmission over the multiple access channel 315. A channel impulse response 345 is associated with the channel 315. Additive white Gaussian Noise (AWGN) 350 and Adjacent Channel Interference (ACI) 355 are introduced by the channel 315 during transmission. The second receiver scheme 310 includes a Hann receiver 360 for receiving the OFDM waveforms transmitted over the multiple access channel 315. The Hann receiver 360 performs Hann windowing of the received OFDM waveforms, as will be explained in more detail below. The frequency domain symbols of the desired user are then obtained from the windowed OFDM symbols by performing FFT 365 and multiple access subcarrier demapping 370. A filter must be applied to the transmitted pilot sequence to obtain the observed pilot sequence 375 for proper channel estimation, as will be explained in more detail below. Using the observed pilot sequence, the channel is estimated 380. Data symbols obtained in 370 are equalized 385 using the channel estimates 380. The equalized symbols are $-\pi/2$-rotated 390 to undo the rotation 325 performed by the transmitting device 305. Finally, ASK demodulation is performed 395.

As such, this second exemplary embodiment performs best compared to the first and third embodiments if the allocated guard band between the subbands of each user is low and it is computationally the least demanding. However, this scheme provides a relatively lower capacity than the first embodiment if the allocated guard band between the subbands of each user is high and requires a modified modulation to be used at the transmitting device. This structure can be implemented in any receiver device that abides by the future Long Term Evolution (LTE) standard and Wi-Fi, or the 5G cellular communication standards if this change to the transmitter is admitted to the standard.

Figure 6:
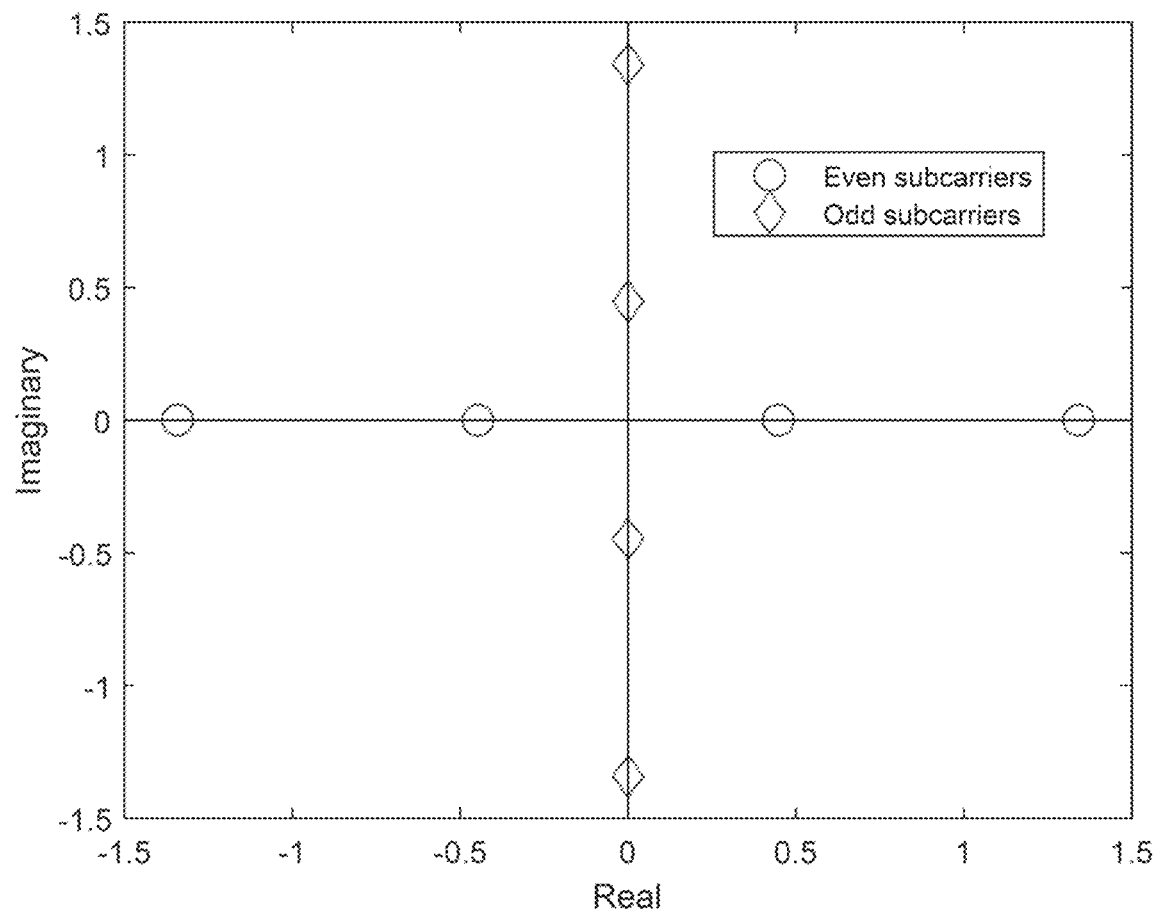
FIG. 6 is a graphical depiction of inventive π/2-MASK modulation for use in coupled with Hann windowing for M=4, or π/2-QASK.

The second exemplary embodiment utilizes $\pi/2$-amplitude shift keying (ASK) modulation at the transmitter. The $\pi/2$-ASK modulation renders the symbols in adjacent subcarriers orthogonal, provided that the channel phase response at those subcarriers is the same. Modulating the single carrier (SC) symbols transmitted in adjacent subcarriers to orthogonal dimensions as seen in FIG. 6 provides a computationally undemanding way to remove most ICI, if not all. Using this modulation, the capacity gains that can be achieved by designing and utilizing modulations, for which consecutive symbols are orthogonal, are demonstrated. This exemplary embodiment can be applied by introducing a new constellation to the currently used older standards, which yields better reception than a standard rectangular receiver for even low levels of ACI. This embodiment is proposed for use as a new downlink (DL) and uplink (UL) and modulation coding scheme (MSC) option for 5G NRs. As this requires changes to the transmitting device and ASK is more susceptible to errors than quadrature amplitude modulation (QAM), receiver embodiments as in FIG. 3 and FIG. 5 are also provided that do not modify the transmitting device.

With reference to FIG. 5, in a third exemplary embodiment, an OFDM communication system 400 includes a third transmitter scheme 405 and a third receiver scheme 410 in wireless communication over a multiple access channel 415. In the third transmitter scheme 405 data is QAM modulated 420. The QAM modulated symbols are then shaped into multiple access (MA) OFDM data subcarriers 425. Inverse Fast Fourier Transformation 430 is then performed on the OFDM data subcarriers to generate the OFDM waveforms. A cyclic prefix is then added 435 to the OFDM waveforms before transmission over the multiple access channel 315. A channel impulse response (CIR) 440 is associated with the channel 415. Additive white Gaussian Noise (AWGN) 445 and Adjacent Channel Interference (ACI) 450 are introduced by the channel 415 during transmission. The third receiver scheme 410 includes a Hann receiver 455 for receiving the OFDM waveforms transmitted over the multiple access channel 415. The Hann receiver 455 performs Hann windowing of the received OFDM waveforms, as will be explained in more detail below. The frequency domain symbols are then obtained from the windowed OFDM symbols by performing FFT 460 and multiple access subcarrier demapping 465. A filter must be applied to the transmitted pilot sequence to obtain the observed pilot sequence 470 for proper channel estimation as will be explained in more detail below. Using the observed pilot sequence, channel is estimated 475. Maximum ratio combining (MRC) 480 followed by a soft decision turbo successive interference cancellation (SIC) 485 structure of the receiver 410 are used for channel equalization, and interference estimation and cancellation. Finally, QAM demodulation 490 is performed to recover the desired signal.

As such, the third exemplary embodiment utilizes an MRC (Maximum Ratio Combining)-turbo soft decision successive interference cancellation (SIC) receiver. This receiver structure is moderately performing regardless of the allocated guard band between the subbands of each user, therefore allows for high performance without modifications to the transmitting device, if the guard band between the subbands of each user is low.

The third embodiment is solely a receiver algorithm that can be used to receive the signals transmitted from a conventional legacy transmitter using any modulation. This embodiment consists of maximizing signal to interference plus noise ratio (SINR) first using maximum ratio combining (MRC), afterwards mitigating the ICI using a soft decision turbo successive interference cancellation (SIC) equalizer. Although this embodiment is computationally complex, since this is not a problem for base stations (BSs), this embodiment is proposed for the reception of UL signals for any OFDM-based communication system.

Notation: $()^T$, $()^*$ and $()^H$ denote the transpose, conjugate and Hermitian operations, $e_{i*}$ and $e_{*j}$ correspond to the ith row and jth column of the identity matrix I, $A \odot B$ and $A \oslash B$ correspond to Hadamard multiplication and division of matrices A and B and A by B, $0_{a \times b}$ and $1_{a \times b}$ denote matrices of zeros and ones with a rows and b columns, diag (v) returns a square diagonal matrix with the elements of vector v on the main diagonal, diag (M) returns the elements on the main diagonal of matrix M in a vector, $CN(\mu, \sigma^2)$ represents complex Gaussian random vectors with mean $\mu$ and variance $\sigma^2$, T (c, r) yields the Toeplitz matrix of which first column is c and first row is r, $A \otimes B$ is the Kronecker tensor product of A and B matrices.

In all embodiments of the present invention, the objective is to receive the information transmitted by a user, hereinafter referred to as the desired user. The desired user is transmitting data over D contiguous subcarriers in an N subcarrier CP-OFDM system. To prevent ISI across consecutive OFDM symbols and to transform the linear convolution of the multipath channel to a circular convolution, a CP of length L samples is prepended to each transmitted OFDM symbol. The samples corresponding to a CP-OFDM symbol of the desired user are denoted by $x_0 \in \mathbb{C}^{N+L \times 1}$, and are obtained as $x_0 = A F_N^H M d$ where $F_N \in \mathbb{C}^{N \times N}$ is the N-point Fast Fourier Transform (FFT) matrix, $M \in \mathbb{C}^{N \times D}$ is the subcarrier mapping matrix, $d \in \mathbb{C}^{D \times 1}$ is the SC modulated data vector to be transmitted and the cyclic prefix addition matrix, $A \in \mathbb{R}^{N+L \times N}$ is given as:

$$A = \begin{bmatrix} 0_{L \times (N-L)} & I_L \\ & I_N \end{bmatrix}.$$

During the transmission of the desired user, the adjacent bands are employed for communication by other users, hereinafter referred to as interfering users, of which signaling is neither synchronous nor orthogonal to that of the desired user. The signals transmitted from all users propagate through a time varying multipath channel before reaching the receiver. Assuming perfect synchronization to the desired user's signal, let the channel gain of the kth sample of the desired and bth interfering user's signals, for $b \neq 0$, during the reception of the nth sample be denoted by $h_{0,n,k}$ and $h_{b,n,k}$, respectively. For clarity, we assume that $\Sigma_{k=1}^{N+L} |h_{b,n,k}|^2 = 1$. If the channel convolution matrix of the bth user for the scope of the desired user's symbol of interest is shown with $H_b \in \mathbb{C}^{(N+L) \times (N+L)}$, respectively; the element in the kth column of nth row of any $H_b$ is $h_{b,n,k}$, respectively. It should be noted that, if bth user's channel was time-invariant, $H_b$ would be a Toeplitz matrix. The first N+L samples received over the wireless medium under perfect synchronization to the desired user's signal normalized to the noise power are stored in $y \in \mathbb{C}^{(N+L) \times 1}$, which is given as $y = z + \Sigma_b \sqrt{\gamma_b} H_b x_b$, where $z \sim CN(0,1)$ is the background additive white Gaussian noise (AWGN), $\gamma_b$ is the signal-to-noise ratio (SNR) of the bth user, and $x_b$ is the sample sequence transmitted by bth user in the reference duration of the desired symbol.

The Hann window must consist exactly of N samples so that the spectrum is sampled at the right points as seen in FIG. 2A and FIG. 2B. Furthermore, discarding the L CP samples at the beginning helps prevent ISI across consecutive desired OFDM symbols transmitted by the desired user. The sample indices for the remaining samples can be written in vector form as $n = [0 \; 1 \; \ldots \; N-1]$. The Hann window function normalized to window this interval without changing it's energy is obtained in vector form as $$W = \frac{4N}{2N + \sin\left(\frac{\pi - 2\pi N}{N-1}\right) \csc\left(\frac{\pi}{N-1}\right) - 1} \sin^2 \frac{\pi n}{N-1}.$$

The Hanning matrix $W \in \mathbb{R}^{N \times (N+L)}$ that removes the CP and windows the remaining received samples with the Hann function is formed as $W = [0^{N \times L} \; \text{diag}(w)]$. The received subcarrier vector $\tilde{r} \in \mathbb{C}^{N \times 1}$ that contains all Hann windowed subcarriers is obtained as $\tilde{r} = F_N W y$.

An estimate of the effective pilot symbols due to Hann windowing are obtained as $\Delta = T(v^T, v) \tilde{d}$, where $v = [1 \; -\frac{1}{2} \; 0^{1 \times (D-2)}]$ and $\tilde{d} \in \mathbb{C}^{D \times 1}$ is a vector of symbols known to both parties of communication, referred to as pilot symbols.

Channel estimation is the performed in the conventional sense using the effective pilot vector $\Delta$ instead of $\tilde{d}$. One most common, simplest but not optimum, way of doing so is obtaining the channel estimate as $\hat{\theta} = (M^T \tilde{r}) \oslash \Delta$ for an OFDM symbol where pilots were transmitted. This is only an example and is not the only way of obtaining the channel estimate, any algorithm in the literature may be used as long as the following point is taken into account. One thing different from the conventional process is that $\Delta$ may have zero elements. For such subcarriers, the channel estimate can not be obtained and must be treated as unknown.

In the first receiver embodiment, the decorrelator at the receiver attempts to invert the multiplication with the channel and window using efficient algebraic techniques to obtain $\hat{d} = (T(v^T, v) \text{diag}(\hat{\theta}))^{-1} (M^T \tilde{r})$. Since $T(v^T, v) \text{diag}(\hat{\theta})$ is a banded matrix, this is easy to implement and computationally effective.

In a second transmitter embodiment implementing a $\pi/2$-MASK transceiver, the $m \in \mathbb{N}_{<M}$th point of the $\pi/2$-MASK constellation modulating the data of dth subcarrier is defined as $$Y_m = \frac{2m + 1 - M}{\sqrt{\frac{(M-1)(M+1)}{3}}} \exp(i\pi d/2),$$

which is the M-ary ASK extension of the modulation, as shown in FIG. 6 for M=4. The received symbol can be demodulated using a conventional ASK detector after derotation and ZF equalization, namely, $\tilde{d}_d = \mathcal{R}\{e_{d*}\tilde{r}\exp(-i\pi d/2)) \oslash \hat{\theta}_d\}$ is fed to the ASK demodulator to demodulate the symbol transmitted in the dth subcarrier. The benefit of this scheme can be observed for a data symbol with disruption to obtain $$\hat{d}_d = \mathcal{R}\left\{\left(\theta_d\left(d_d \exp(i\pi d/2) - \frac{d_{d-1}\exp\left(\frac{i\pi(d-1)}{2}\right) + d_{d+1}\exp\left(\frac{i\pi(d+1)}{2}\right)}{2}\right) + \hat{Z}_d\right) e^{-i\pi d/2}/\hat{\theta}_d\right\}$$

where $\hat{z}_d \sim \mathcal{CN}(0, \hat{\sigma}_{z_d})$, where $\hat{\sigma}_{z_d}$ is the estimated disturbance variance affecting dth subcarrier; which reduces to $$\hat{d}_d = d_d + \mathcal{R}\left\{\frac{\hat{z}_d \exp(-i\pi d/2)}{\hat{\theta}_d}\right\}$$

since $\mathcal{R}\{d_{d-1} \exp(-i\pi/2)\} = \mathcal{R}\{d_{d+1} \exp(+i\pi/2)\} \triangleq 0$. The post-processing disturbance variance for both the first and second embodiments is $\hat{\sigma}_z^2 \oslash |\hat{\theta}|^2$.

In the third receiver embodiment implementing the MRC-SIC receiver, received subcarriers that are adjacent to the edgemost subcarriers carrying data carry copies of the signals transmitted at these subcarriers after Hann window is applied. In an attempt to utilize this energy, this receiver first demaps these subcarriers as well using an extended demapping matrix $\check{M}^T \in \mathbb{Z}^{(D+2) \times N}$. The received symbols in this case $\check{d} \in \mathbb{C}^{(D+2) \times 1}$ are written as $\check{d} = \check{M}^T \check{\Theta} d \triangleq \check{H}\check{r}$, wherein, $\check{\Theta} \in \mathbb{C}^{N \times N}$ is the effective channel frequency response matrix obtained as $\Theta = F_N W H_0 A F_N^H$ and the extended effective channel frequency response estimate matrix $\hat{H} \in \mathbb{C}^{(D+2) \times D}$ is obtained as $\hat{H} = T([-\frac{1}{2} \text{ v } 0]^T, [-\frac{1}{2} \; 0^{1 \times (D-1)}]) \text{diag}(\hat{\theta})$. The power due to the signal modulated to the mth transmitted subcarrier observed in the kth observed subcarrier is in the kth row and mth column of $\Sigma_{s+i}^2 \in \mathbb{R}^{(D+2) \times D}$ where $\Sigma_{S+i}^2$, $\check{H} \odot \check{H}^*$.

The signal-plus-ICI power on the kth observed subcarrier is given in the kth column of $\sigma_{s+i}^2 = 1^{1 \times D}(\Sigma_{S+i}^2)^T$.

If the mth transmitted subcarrier is in interest, the disruption-plus-ICI power contribution that would come from combining the kth observed subcarrier with unit gain is given by the mth row and kth column of $\Sigma_{d+i}^2 = (1^{D \times 1} \otimes (\sigma_z^2 + \sigma_{s+i}^2)) - (\Sigma_{s+i}^2)^T$, where $\Sigma_{d+i}^2 \in \mathbb{R}^{(D+2) \times D}$. The MRC matrix is then $\check{C} = \check{H}^H \oslash \Sigma_{d+i}^2$, where $\check{C} \in \mathbb{C}^{D \times (D+2)}$. Although $\check{C}$ maximizes the SINR, the resulting data estimates $\check{C}\check{d}$ would be scaled with non-unity complex coefficients. The "equalized" MRC matrix $C \in \mathbb{C}^{D \times (D+2)}$ is obtained as $C = \check{C} \oslash (1^{1 \times (D+2)} \otimes \text{diag}(\check{C}\check{H}))$. The symbol estimates at the MRC output $\hat{d} \in \mathbb{C}^{D \times 1}$ is $\hat{d} = C\check{d}$. The post-MRC gain of the ICI component present on the mth subcarrier due to the kth subcarrier is given on the mth row and kth column of $= C\check{H} - I^D$, where $G \in \mathbb{C}^{D \times D}$.

The disruption-plus-ICI power remaining on the mth subcarrier after MRC is given on the mth column of $\rho_{d+i}^2 = 1^{1 \times D}(G \odot G^*) + ((C \odot C^*)(\sigma_z^2)^T)^T$ where $\rho_{d+i}^2 \in \mathbb{C}^{D \times 1}$. $\hat{d}$, $G$ & $\rho_{d+i}^2$, are fed to the SISO decoder and the soft decision turbo SIC equalizer is utilized to obtain symbol estimates $\hat{d}$.

The gains of Hann windowing OFDM receivers are shown using numerical simulations. A 4 GHz carrier frequency and a system bandwidth of 10 MHz were primarily used in the simulations. The desired user's channel has the tapped delay line (TDL)-A power delay profile (PDP) with 30 ns RMS delay spread and mobility 120 km/h. This corresponds to the limit case where normal CP overhead is valid. There are two identical interfering users each utilizing the bands on either side of the band occupied by the desired user. There is a certain guard band between each user. The interfering users' channels have the TDL-C PDP 300 ns RMS delay spread and mobility 3 km/h. There is also a 128 samples time offset between the desired user and both interfering users. The desired user has a subcarrier spacing of 60 kHz, whereas both interfering users have subcarrier spacings of 15 kHz. Both interfering users utilize normal CP overhead and utilize their whole CP for subcarrier specific window (SSW) optimized to maximize their frequency localization. The desired user employs normal CP overhead for all cases except the extended SSW case, for which extended overhead is used and the difference in-between is utilized for per-subcarrier windowing maximizing ACI rejection. The window duration of each subcarrier d in the extensionless SSW case was determined using $$K_d = \underset{k}{\text{argmax}} \; \tilde{D}_{d*}(e_{d*} M^T F_N B_k Y)^H,$$

where $\tilde{D} \in \mathbb{C}^{D \times S}$ is matrix of pilot symbols in a frame that has zeroes where there are data symbols and $Y \in \mathbb{C}^{(N+L) \times S}$ is all received samples of a frame converted to S parallel streams of N+L samples each. It is assumed that an OFDM symbol, of which all D=12 subcarriers allotted to the desired user, is loaded with physical uplink shared channel (PUSCH) DMRS sequences is sent every 4 OFDM symbols of 75 frames consisting of S=144 symbols each. $\gamma_1 = \gamma_2 = 20$ dB, and $\gamma_0$ is swept from 5 dB to 35 dB. The bit probabilities are calculated using approximate log-likelihood ratios (LLRs) and 4 soft decision turbo SIC iterations are performed. Data bits are low density parity check (LDPC) coded with code rate ¼. Desired user uses QPSK modulation in all implementations except for Hann windowing with $\pi/2$-QASK modulation.

Figure 7A:
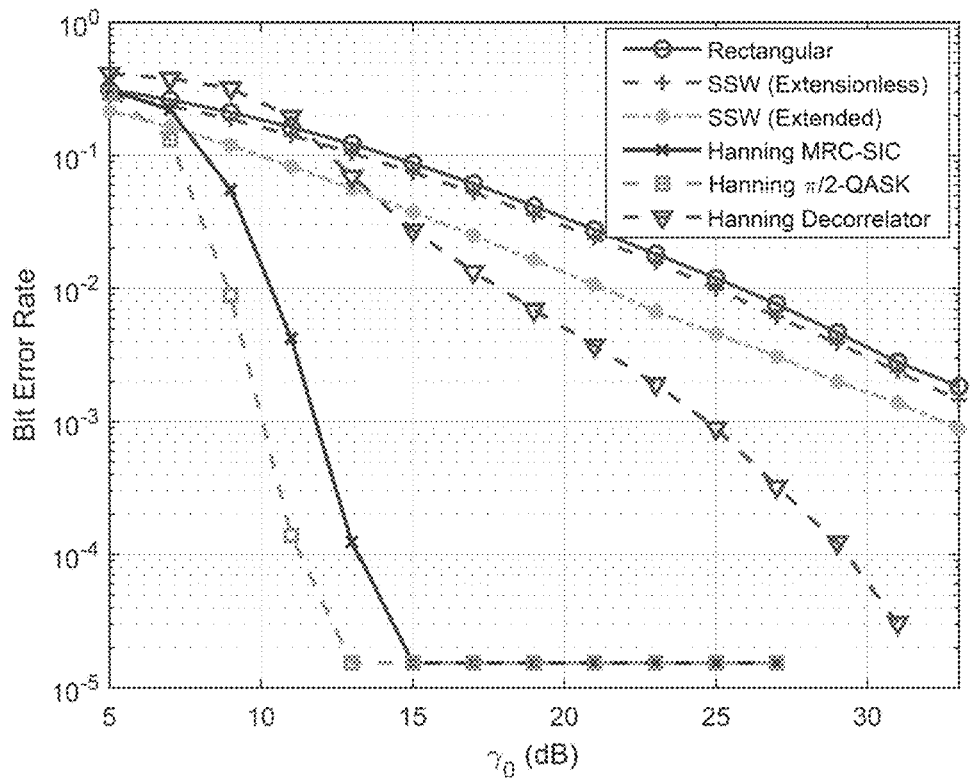
FIG. 7A is a graphical illustration of the bit-error-rate of the receiver using a rectangular window function, the extensionless optimum windowing using normal CP overhead, the extensionless optimum windowing using extended CP overhead and various embodiments of the invention as a function of desired user's signal to noise ratio for low amount of guard band allocated between the desired user and interfering users.
Figure 8A:
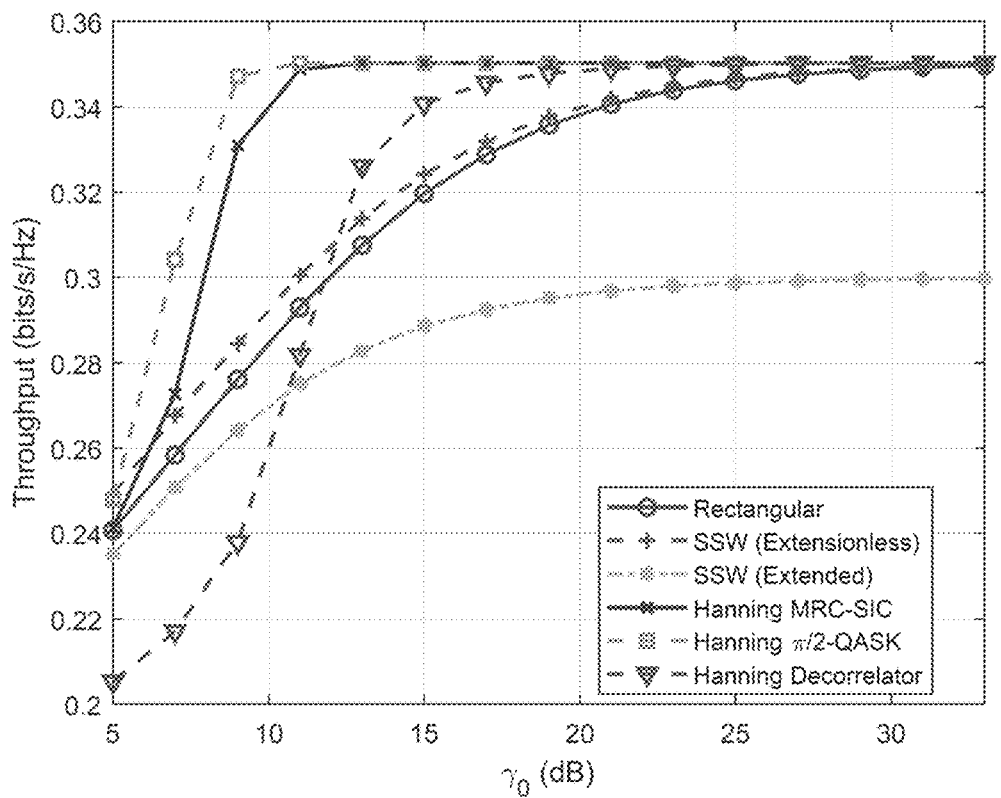
FIG. 8A is the throughput in accordance with the results of FIG. 7A.

It can be seen in FIG. 7A, that Hann windowing coupled with $\pi/2$-QASK modulation yields target $10^{-2}$ bit-error rate (BER) at only 9 dB SNR, with the computationally exhaustive MRC-SIC receiver following at 11 dB, and the computationally less exhaustive decorrelator reaching this value at 19 dB, whereas the extended and extensionless SSW algorithms can reach this BER rate at 23 dB and 25 dB, respectively, and the baseline rectangular receiver reaches this BER rate at 27 dB if the guard band between each user is 30 kHz. Furthermore, FIG. 8A shows that although extended SSW has a better BER performance than extensionless, it yields less throughput at all times due to the increased time overhead. Hann windowing coupled with $\pi/2$-QASK modulation always outperforms extensionless SSW and MRC-SIC and decorrelating Hanning receivers outperform for SNR values greater than 7 dB and 13 dB, respectively.

Figure 7B:
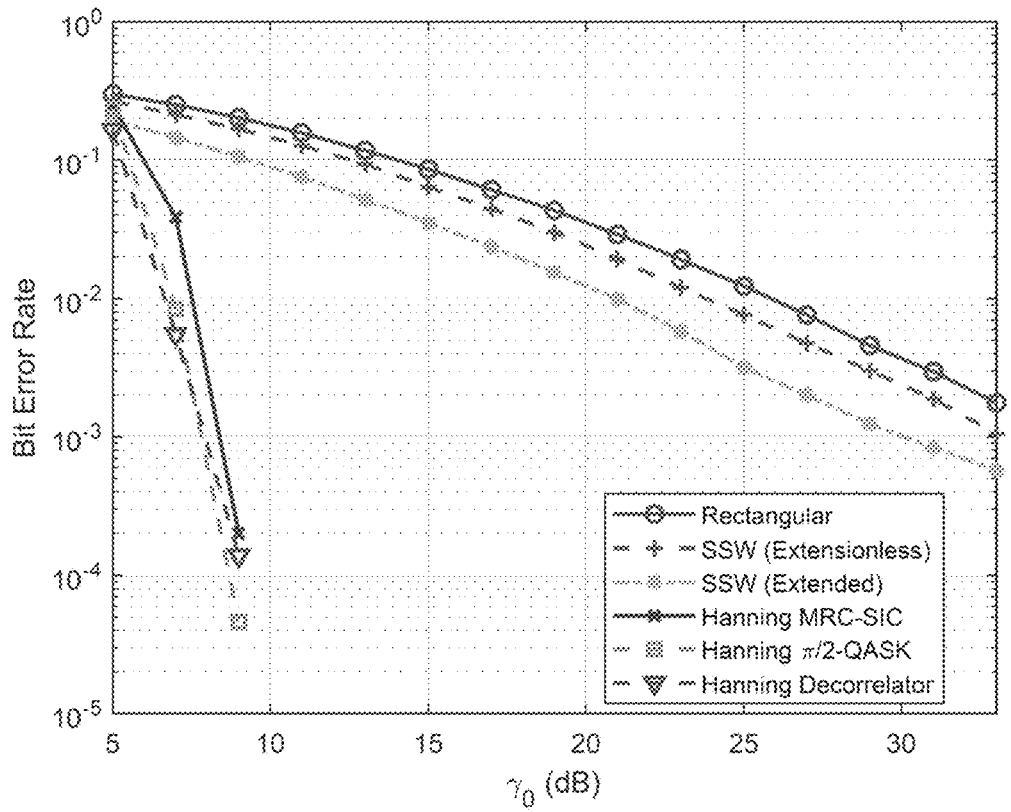
FIG. 7B is a graphical illustration of the bit-error-rate of the receiver using a rectangular window function, the extensionless optimum windowing using normal CP overhead, the extensionless optimum windowing using extended CP overhead and various embodiments of the invention as a function of desired user's signal to noise ratio for high amount of guard band allocated between the desired user and interfering users.
Figure 8B:
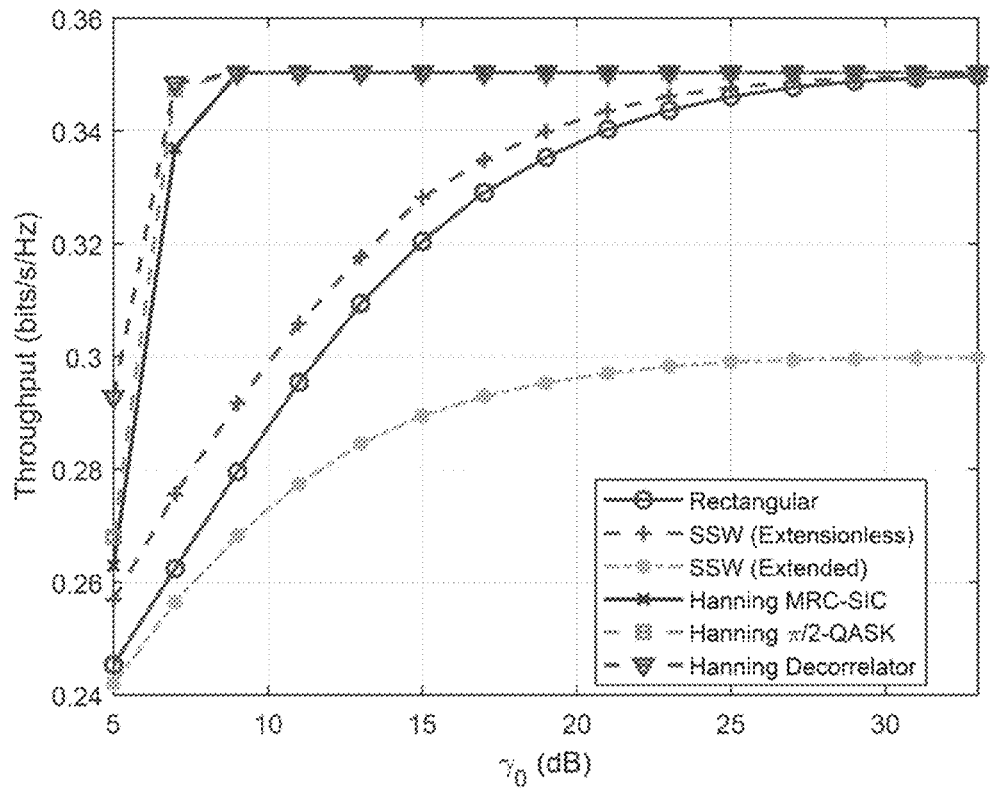
FIG. 8B is the throughput in accordance with the results of FIG. 7B.

If the amount of guard band between each user is increased to 105 kHz, FIG. 7B shows that the Hanning decorrelator outperforms all Hanning receivers and the prior art, almost always. Both Hanning decorrelator and Hann windowing coupled with $\pi/2$-QASK modulation reach target BER only at 7 dB SNR and MRC-SIC has reduced its SNR threshold to 9 dB. Beyond 9 dB, none of the Hann windowing receivers make any errors, whereas the only improvement for the prior art is that SNR threshold for extended SSW to reach target BER decreased by 2 dB. FIG. 8B shows that all Hann windowing transceivers outperform the prior art transceivers at all SNR values.

The Hanning OFDM transceivers and receivers of the present invention, coupled with simple interference mitigation techniques, yield higher capacities than rectangular and state-of-the-art Nyquist windowing receivers in the presence of higher powered non-orthogonal signals employing adjacent channels. The proposed optional transmitter modifications yield signals that remain orthogonal to those generated by legacy transmitters. For low guard bands intervals between interferers, Hann windowing receivers coupled with transmitter modifications perform best, followed by computationally intensive MRC-SIC receivers and finally by computationally undemanding decorrelating receivers, all outperforming the prior art. For increased guard band intervals, computationally undemanding receivers perform best, leaving no need for transmitter modifications or computationally demanding receiver algorithms.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

What is claimed is:

1. A method for Orthogonal Frequency Division Multiplexing (OFDM) transmission and reception, the method comprising:

receiving, at a Hann receiver, a CP-OFDM symbol comprising a cyclic prefix (CP);

removing the cyclic prefix from the received CP-OFDM symbol to generate an OFDM symbol;

applying a Hann window to the OFDM symbol to obtain a Hann windowed OFDM symbol, wherein applying the Hann window introduces inter-carrier interference (ICI) into the OFDM symbol;

applying Fast Fourier Transformation (FFT) to the Hann windowed OFDM symbol to obtain a plurality of frequency domain subcarriers;

applying multiple access (MA) subcarrier demapping to the plurality of frequency domain subcarriers to obtain a plurality of MA demapped frequency domain subcarriers;

receiving, at the Hann receiver, a transmitted pilot sequence comprising a plurality of frequency domain pilot symbols;

filtering the plurality of frequency domain pilot symbols of the transmitted pilot sequence to obtain an observed pilot sequence;

performing channel estimation based upon the observed pilot sequence to estimate the ICI introduced into the OFDM symbols by the application of the Hann window;

cancelling the ICI from the plurality of MA demapped frequency domain subcarriers based upon the channel estimation, wherein applying maximum ratio combining (MRC) and soft decision turbo successive interference cancellation (SIC) structure are applied at the Hann receiver to perform channel equalization and the ICI estimation and cancellation; and applying demodulation to the MA demapped subcarriers to recover the desired signal.

2. The method of claim 1, wherein the plurality of MA demapped subcarriers of the CP-OFDM symbol are π/2-binary phase shift keying (BPSK) modulated and wherein applying demodulation further comprises, applying π/2-BPSK demodulation to the plurality of MA demapped subcarriers.

3. The method of claim 1, wherein the plurality of MA demapped subcarriers of CP-OFDM symbol are Quadrature Amplitude Modulated (QAM) CP-OFDM and wherein applying demodulation further comprises, applying QAM demodulation to the plurality of MA demapped subcarriers.

4. The method of claim 1, wherein the plurality of MA demapped subcarriers of the CP-OFDM symbols are π/2-amplitude shift keying (ASK) modulated and transmitted over a multiple access channel prior to being received at the Hann receiver and wherein the method further comprises applying a π/2 rotation to the ASK modulated symbols to generate π/2-ASK modulated symbols at a transmitter.

5. The method of claim 4, further comprising:
applying multiple access (MA) subcarrier mapping to the plurality of π/2-ASK modulated symbols at the transmitter to generate an MA subcarrier mapped plurality of π/2-ASK modulated symbols;
applying Inverse Fast Fourier Transformation to the MA subcarrier mapped plurality of π/2-ASK modulated symbols at the transmitter to generate a time-domain OFDM symbol consisting of MA subcarrier mapped plurality of π/2-ASK modulated symbols; and
adding a cyclic prefix (CP) to the time-domain OFDM symbol consisting of MA subcarrier mapped plurality of π/2-ASK modulated symbols at the transmitter to generate the time-domain CP-OFDM symbol consisting of MA subcarrier mapped plurality of π/2-ASK modulated symbols.

6. The method of claim 4, further comprising, applying −π/2 rotation to the plurality of subcarriers received at the Hann receiver.

7. A method for Orthogonal Frequency Division Multiplexing (OFDM) transmission and reception, the method comprising:
performing amplitude shift keying (ASK) modulation of bits at a transmitter, the ASK modulated bits to be transmitted to a receiver over a multiple access channel;
applying π/2-rotation to the ASK modulated symbols to generate π/2-MASK modulated symbols;
applying multiple access mapping to the π/2-MASK modulated symbols to shape the symbols into multiple access (MA) OFDM data subcarriers;
performing Inverse Fast Fourier Transformation (IFFT) on the OFDM data subcarriers to generate the OFDM waveforms;
adding a cyclic prefix to the OFDM waveforms before transmission over the multiple access channel;
introducing a channel impulse response (CIR) and adjacent channel interference (ACI) into the OFDM waveforms during transmission over the channel;
receiving the OFDM waveforms at a Hann receiver;
performing Hann windowing of the received OFDM waveforms;
performing Fast Fourier Transformation (FFT) and multiple access subcarrier demapping to obtain frequency domain symbols of a desired user;
estimating the channel; and
equalizing the frequency domain symbols using the channel estimates;
applying −π/2 rotation to the equalized frequency domain symbols and ASK demodulation to the symbols to recover desired bits.

8. A system for improving Orthogonal Frequency Division Multiplexing (OFDM) reception, the system comprising:
a Hann receiver for;
receiving, at a Hann receiver, a CP-OFDM symbol comprising a cyclic prefix (CP);
removing the cyclic prefix from the received CP-OFDM symbol to generate an OFDM symbol;
applying a Hann window to the OFDM symbol to obtain a Hann windowed OFDM symbol, wherein applying the Hann window introduces inter-carrier interference (ICI) into the OFDM symbol;
applying Fast Fourier Transformation (FFT) to the Hann windowed OFDM symbol to obtain a plurality of frequency domain subcarriers;
applying multiple access (MA) subcarrier demapping to the plurality of frequency domain subcarriers to obtain a plurality of MA demapped frequency domain subcarriers;
receiving a transmitted pilot sequence comprising a plurality of frequency domain pilot symbols;
filtering the plurality of frequency domain pilot symbols of the transmitted pilot sequence to obtain an observed pilot sequence;
performing channel estimation based upon the observed pilot sequence to estimate the ICI introduced into the OFDM symbols by the application of the Hann window;
cancelling the ICI from the plurality of MA demapped frequency domain subcarriers based upon the channel estimation, wherein applying maximum ratio combining (MRC) and soft decision turbo successive interference cancellation (SIC) structure are applied at the Hann receiver to perform channel equalization and the ICI estimation and cancellation; and
applying demodulation to the MA demapped subcarriers to recover the desired signal.

9. The method of claim 8, wherein the plurality of MA demapped subcarriers of the CP-OFDM symbol are π/2-binary phase shift keying (BPSK) modulated and wherein applying demodulation further comprises, applying π/2-BPSK demodulation to the plurality of MA demapped subcarriers.

10. The method of claim 1, wherein the plurality of MA demapped subcarriers of CP-OFDM symbol are Quadrature Amplitude Modulated (QAM) CP-OFDM and wherein applying demodulation further comprises, applying QAM demodulation to the plurality of MA demapped subcarriers.

11. The system of claim 8, wherein the plurality of MA demapped subcarriers are amplitude shift keying (ASK) modulated and wherein the system further comprises:
a transmitter for applying π/2 rotation to the plurality of ASK modulated symbols; and
the receiver is further for applying −π/2 rotation at the Hann receiver.

12. A computer program product comprising computer executable instructions embodied in a non-transitory computer-readable medium for performing steps comprising, receiving, at a Hann receiver, a CP-OFDM symbol comprising a cyclic prefix (CP), removing the cyclic prefix from the received CP-OFDM symbol to generate an Orthogonal Frequency Division Multiplexing (OFDM) symbol, applying a Hann window to the OFDM symbol to obtain a Hann windowed OFDM symbol, wherein applying the Hann Window introduces inter-carrier interference (ICI) into the OFDM symbol, applying a Fast Fourier Transformation (FFT) to the Hann windowed OFDM symbol to obtain a plurality of subcarriers, applying multiple access (MA) subcarrier demapping to the plurality of frequency domain subcarriers to obtain a plurality of MA demapped frequency domain subcarriers, receiving a transmitted pilot sequence comprising a plurality of frequency domain pilot symbols, filtering the plurality of frequency domain pilot symbols of the transmitted pilot sequence to obtain an observed pilot sequence, performing channel estimation based upon the observed pilot sequence to estimate the ICI introduced into the OFDM symbols by the application of the Hann window and cancelling the ICI from the plurality of MA demapped frequency domain subcarriers based upon the channel estimation, wherein applying maximum ratio combining (MRC) and soft decision turbo successive interference cancellation (SIC) structure are applied at the Hann receiver to perform channel equalization and the ICI estimation and cancellation and applying demodulation to the MA demapped subcarriers to recover the desired signal.

13. The computer program product of claim 12, wherein the CP-OFDM symbol comprises a plurality of multiple access (MA) mapped subcarriers modulated by $\pi/2$-binary phase shift keying (BPSK).

\* \* \* \* \*